2 Sheets—Sheet 1.

A. S. BAKER.

MECHANICAL MOVEMENT.

No. 9,854. Reissued Sept. 6, 1881.

WITNESSES:

O. D. Mott

W. C. Seely

INVENTOR:

Allen S. Baker

BY Rich. A. Dyer

ATTORNEY.

N. PETERS. Photo-Lithographer, Washington, D. C.

2 Sheets—Sheet 2.

A. S. BAKER.

MECHANICAL MOVEMENT.

No. 9,854. Reissued Sept. 6, 1881.

WITNESSES:

D. D. Mott

W. W. Seely

INVENTOR:

Allen S. Baker

BY Rich^d N. Dyer

ATTORNEY.

N. PETERS, Photo-Lithographer, Washington, D. C.

UNITED STATES PATENT OFFICE.

ALLEN S. BAKER, OF EVANSVILLE, WISCONSIN.

MECHANICAL MOVEMENT.

SPECIFICATION forming part of Reissued Letters Patent No. 9,854, dated September 6, 1881.

Original No. 232,104, dated September 14, 1880. Application for reissue filed July 30, 1881.

*To all whom it may concern:*

Be it known that I, ALLEN S. BAKER, of Evansville, in the county of Rock and State of Wisconsin, have invented a certain new and useful Improvement in Mechanical Movements, of which the following is a specification.

The object I have in view is to produce simple and efficient means for transmitting the rotary movement of one shaft to another shaft situated in a plane parallel, or substantially so, to the plane in which the power-shaft is located, which will operate without the use of gear-wheels or belts, or any intermediate shaft, will have no dead-centers, can be used to connect shafts at any distance apart, and will impart a positive rotary motion to the driven shaft without loss of power other than that due to friction.

The device has especial advantages when applied as a rotary power for windmills, since it can be swiveled to allow for the movement of the turn-table, and has no tendency to shift the wind-wheel out of the wind, as does the ordinary gear-wheel connection, the power necessary to drive which reacts upon the turn-table and throws the wheel more or less edgewise to the wind.

My invention therein consists in the peculiar devices for accomplishing these objects, as fully hereinafter explained, and pointed out by the claims.

Figure 1:
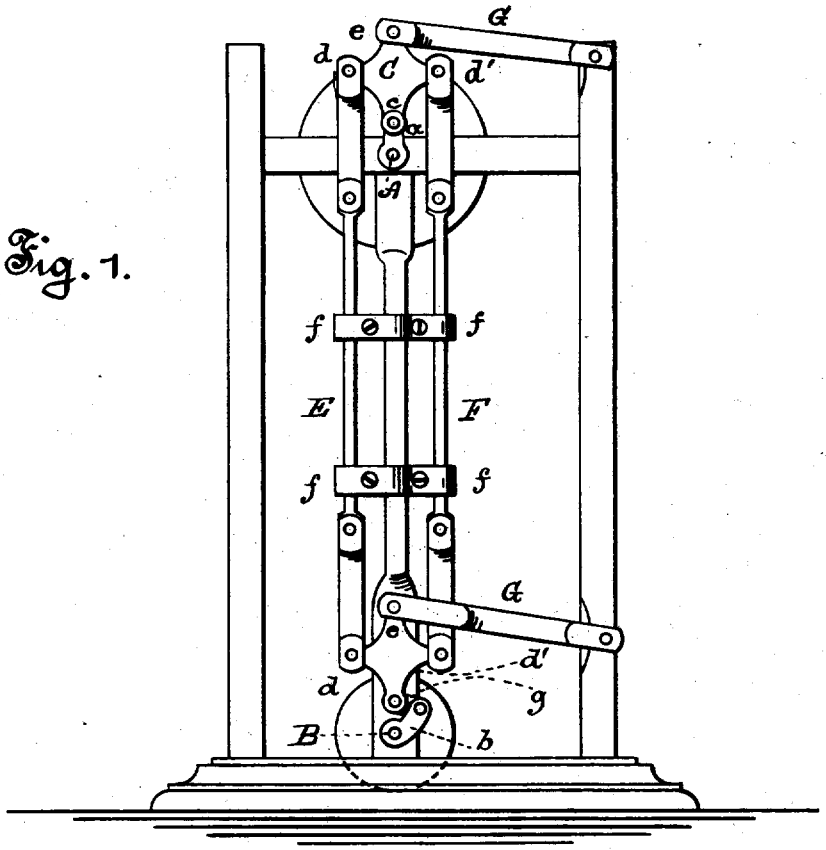
Figure 2:
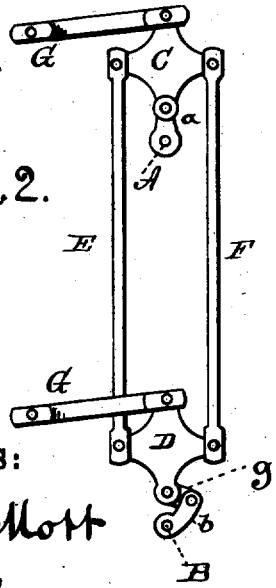
Figure 3:
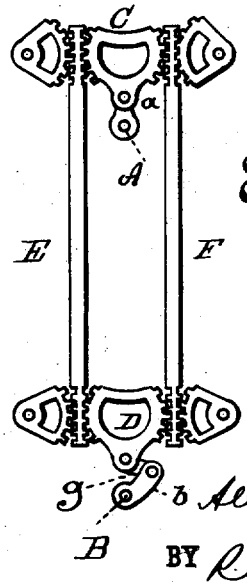

In the accompanying drawings, forming a part hereof, Figure 1 is an elevation of the movement having guided connections; Fig. 2, an elevation showing the simplest form of the movement without guided connections; Fig. 3, a modification of the movement, and Fig. 4 a sectional elevation of the movement applied to a windmill.

A is the power-shaft, and B the shaft to be driven, having single cranks. (Shown respectively by *a* and *b*.) Pivoted to the cranks are similar working-plates, C D, which are connected by rods E F. The two working-plates being guided in the same manner, the motions imparted to the working-plate C by the power-crank *a* will be exactly or nearly described by the other working-plate, D, and the crank *b* will consequently be turned. These working-plates may have three or four arms. Each working-plate has a lower central arm, *c*, pivoted to the crank, and two side arms, *d d'*, connected with the rods E F. The central upper point of each working-plate is guided to move in substantially a vertical line. This may be done by means of a cross-pin working in vertical grooves in the frame, but more conveniently by a rocking arm, G, pivoted to the frame and to the central upper point of the working-plate, which central upper point may be an arm, *e*.

The working-plates C D form connecting devices whereby the rotary motion of one single crank can be transmitted to another single crank through two reciprocating rods without dead-centers or loss of power other than that due to the friction of the parts.

If the distance between the shafts A B be short, the connecting-rods E F need not be guided, Fig. 2; but where the distance requires it, to prevent them from bending or springing, the rods are passed through guides *f*, and are jointed, as shown in Fig. 1.

To allow for the difference of movement the lower working-plate, D, is connected to the crank *b* by a short link, *g*, or the wrist-pin may work in a slot in the end of the crank. A compensating device is thus provided which permits the driven crank and the point of the lower working-plate, where connected therewith, to have somewhat different movements, to allow for defects in the construction and adjustment of the parts.

It will be seen that the strain upon the connecting-rods is always exerted in the direction of their length, and that they are not required to be made heavy to resist any lateral strain.

Figure 4:
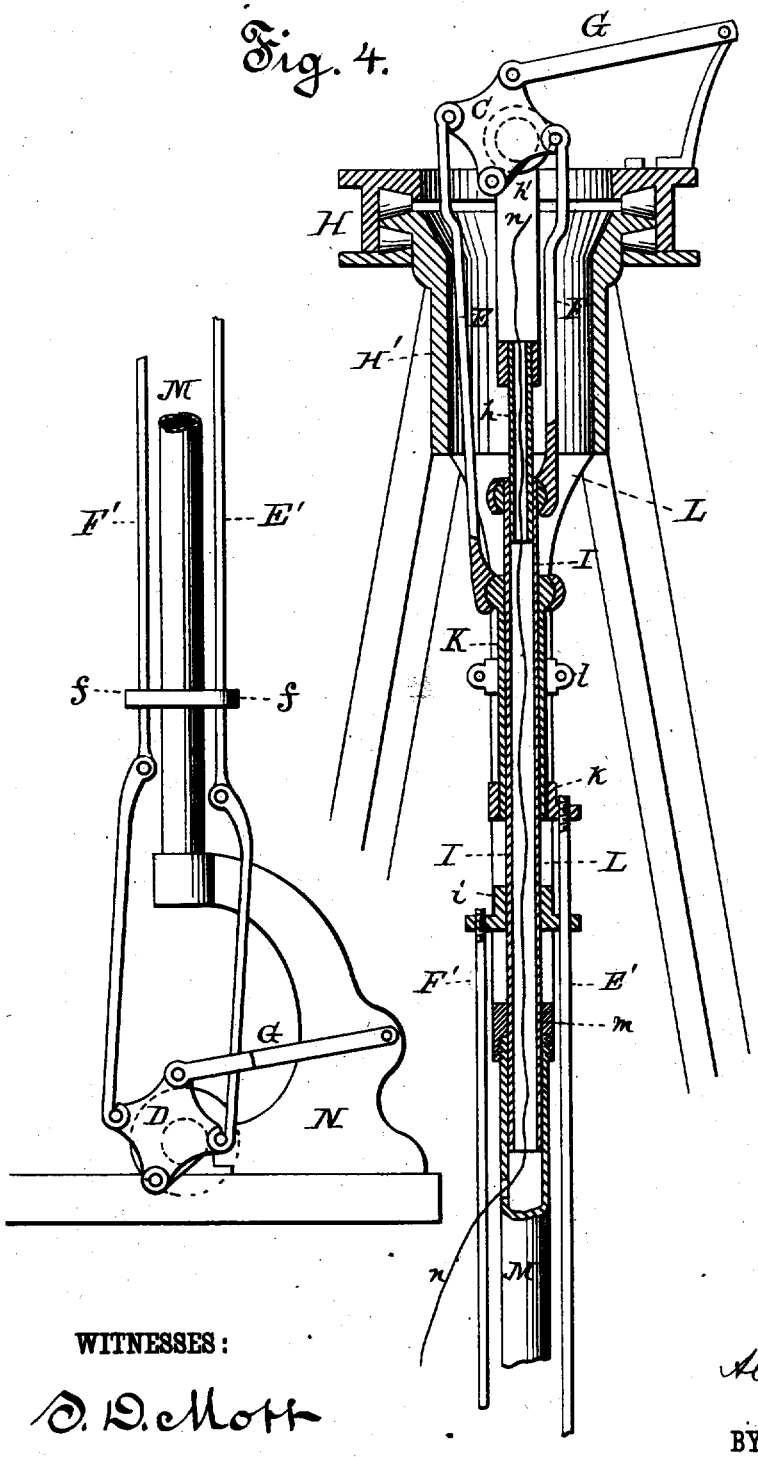

When applied as a rotary power for windmills the connection between the upper and lower working-plates must be swiveled, so as to allow the turn-table of the windmill to revolve and present the wheel in any direction. This construction is shown in Fig. 4.

The turn-table of the mill is designated by letter H, the tower-casting by H'. The upper working-plate, C, is connected to the crank on the inner end of the windmill-shaft, and is guided by a rocking arm, G, pivoted to a standard rising from the turn-table. A pipe, *h*, is suspended centrally to the tower-casting, and is rigidly fixed to an arm, *h'*, extending downwardly from the turn-table. Over the pipe *h* slides a pipe, I, which is connected at its upper end by a ball-and-socket joint with the rod F, leading to the upper working-plate. The pipe I extends down through a pipe, K, and below such pipe K receives a two-armed casting, *i*, into one arm of which is screwed the rod F′, leading to the lower working-plate, D. The pipe K is connected by a ball-and-socket joint at its upper end with the rod E from the upper working-plate, and at its lower end has secured to it a one-armed casting, *k*, into which is screwed the rod E′, leading to the lower working-plate. An arm, L, extends down from the tower-casting and has a rigid bearing, *l*, which receives the pipe K and prevents such pipe from turning by means of a lug and groove. (Not shown.) The rod E′ passes through one arm of the casting *i* and holds the pipe I from turning. The arm L extends below the casting *i* and has a collar, *m*, in which the pipe I slides. This collar *m* receives a pipe, M, leading to the lower frame, N, and having guides *f* for the rods E′ F′. The arm L, connecting with the tower-casting, the pipe M, having a rigid connection with that arm, and the frame N together form a rigid stay or connection between the upper and lower shafts, independent of the frame-work, for taking the strain in both directions and carrying the guides for the reciprocating rods. A similar stay is also shown in Fig. 1. The shifting-wire *n*, by which the wind-wheel is thrown out of the wind, enters the fixed pipe *h*, and then passes down through the pipe I into pipe M, and out through a slot in pipe M and down to the ground. The ball-and-socket joints allow the rods E F to turn freely on the pipes I K. No matter what position the turn-table is in, the working-plates will have similar movements, and there is not the least tendency to shift the wheel out of the wind.

As a modification of my device the working-plates may be segments of gearing and engage with teeth on the ends of the connecting-rods, and such connecting-rods may be held in place and guided by pivoted toothed sectors, as shown in Fig. 3.

My mechanical movement can be applied in machine-shops to drive the shafts on the floors above the engine-room, and can be used to advantage in various machines where it is desired to transmit the rotary movement of one shaft to one or more other shafts situated in planes parallel to the power-shaft, or substantially so.

What I claim as my invention is—

1. In mechanism for transmitting a positive rotary motion from one shaft to another, the combination of two rods having a reciprocating movement imparted to them by means of a crank and connecting device, substantially as set forth.

2. In mechanism for transmitting a positive rotary motion from one shaft to another, the reciprocating rods operated by a crank and connecting device, in combination with a crank and similar connecting device for transforming the reciprocating movement of the rods into a rotary motion, substantially as set forth.

3. In mechanism for transmitting a positive rotary motion from one shaft to another, the combination of reciprocating rods transmitting the motion from one shaft to the other with a stay rigidly connecting said shafts independent of the frame-work, substantially as described.

4. In mechanism for transmitting a positive rotary motion from one shaft to another, the combination of cranks, reciprocating rods, and connecting devices with a stay rigidly connecting the shafts, substantially as described.

5. In mechanism for transmitting a positive rotary motion from one shaft to another, the combination of the cranks, reciprocating rods, and connecting devices with a compensating device at the driven crank to allow for the difference in movement, substantially as described.

6. In a rotary power for windmills, the reciprocating rods swiveled to permit the free movement of the turn-table, in combination with a crank and connecting device for operating said rods, substantially as described.

7. In a rotary power for windmills, the combination of the cranks and connecting devices with the swiveled reciprocating rods and a compensating device at the driven crank, substantially as and for the purposes set forth.

8. The means for transmitting power from one crank to another, consisting of two similar working-plates carried by the cranks and reciprocating rods connecting such working-plates, so that they will have like movements, substantially as described.

9. In a mechanical movement, the combination of the two working-plates carried by the cranks and the swivel-connections between such working-plates, substantially as described.

ALLEN S. BAKER.

Witnesses:
C. M. TUTTLE,
J. H. HOSKINS.